United States Patent
Pedretti

Patent Number: 5,811,942
Date of Patent: Sep. 22, 1998

[54] DEVICE FOR OPTIMIZED MANAGEMENT OF FLUORESCENT LAMPS

[75] Inventor: Roberto Pedretti, Lugano-Paradiso, Switzerland

[73] Assignee: Bob Hammer Systems Solutions S.A., Lugano, Switzerland

[21] Appl. No.: 612,001

[22] Filed: Mar. 5, 1996

[30] Foreign Application Priority Data

Jul. 11, 1995 [CH] Switzerland .......... 02 040/95

[51] Int. Cl.⁶ .................................................. H05B 37/02
[52] U.S. Cl. ........................ 315/312; 315/158; 315/292; 315/316
[58] Field of Search ............................... 315/292, DIG. 4, 315/316, 324, 308, 307, 158, 159, 156, 224, 86, 312

[56] References Cited

U.S. PATENT DOCUMENTS 4,733,138  3/1988  Pearlman et al. ................ 315/307

Primary Examiner—Robert Pascal
Assistant Examiner—David Vu
Attorney, Agent, or Firm—Young & Thompson

[57] ABSTRACT

A device for optimized management of fluorescent lamps with a control module having microprocessors with a control program in permanent memory (EPROM, PROM or equivalent); an internal control program, stored in the memory; and an electronic power module for direct power supply of lamps to change the voltage at the output within a range between a maximum power supply voltage and a lower appropriate voltage, at the command of the control module. The memory has at least some of the following accessories: A/D converters; an internal "real time" clock; an RS232 or RS422 asynchronous or synchronous serial interface; EAROM, EEPROM memory; a keyboard with LCD or LED display; control pushbuttons and indicator lights; and analog sensors for ac voltage, ambient light, external light, ambient temperature, power module temperature, and alternating current, the number and type of sensors being dependent on the selected configuration which in turn depends on user requirements. The internal control program has the following functions: automatic day/evening/night; voltage stabilizer; maximum economy; constant luminosity; bypass; motor starting; programming and remote dialog; and independent management of outputs.

8 Claims, 12 Drawing Sheets

DEVICE FOR OPTIMIZED MANAGEMENT OF FLUORESCENT LAMPS

BACKGROUND OF THE INVENTION

This invention relates to a device for optimized management of fluorescent lamps.

Specifically, this invention relates in its essence to an intelligent regulation system which uses the distinctive features of fluorescent lamps to reduce their consumption of current by acting on the power supply voltage.

The general principle of this invention consists in the fact that a reduction in the power supply voltage of many electrical devices results in a parallel reduction in the consumption of current. This holds especially true for various types of lighting units. In general, however, a reduction of voltage and therefore of current is accompanied by an analogous and proportional reduction in the luminous flux. The reverse phenomenon is also true: that an increase in the power supply voltage (for example due to natural fluctuations in distribution) causes an increase in luminosity but also in consumption. In all cases, fluctuations in the power supply voltage, especially fluctuations upward, reduce the service life of these lamps.

In fluorescent lamps equipped with ballast, it has been observed that the amount of the luminous flux is not directly proportional to the power supply voltage, as is true for example for incandescent lamps. Once the electrical discharge has been triggered which causes emission of light from the fluorescent materials inside the glass discharge tube, the voltage can then be reduced without causing significant decreases in the luminous flux.

This distinctive feature can be effectively exploited to economize on management, the costs of which can be considerable in large lighting systems. By placing between the power metering devices and lamps an automatic device which regulates the voltage in such a way as to keep it at the lowest possible level compatible with desired light, temperature, input voltage, ignition time, possible solar light, and time of day, considerable reductions in consumption can be obtained.

It should be noted that the consumption meter used by electrical companies measures the power consumed by integrating the product moment by moment between voltage and current. A reduction in the current reduces the recorded consumption.

SUMMARY OF THE INVENTION

For greatest efficiency, the device according to the invention provides for measurement of the input voltage to achieve good stabilization, measurement of the ambient temperature because it affects start-up voltage and maintenance, and measurement of the amount of solar light present because it is a determining factor in the subjective sensation of luminosity.

The object of this invention is a device which—entirely automatically, and taking into account the aforementioned parameters—makes it possible to regulate the current supplied to the lamps, with the lowest possible characteristic absorption and without creating phase displacement towards distribution. The system, as already indicated, comprises a control module and a power module.

BRIEF DESCRIPTION OF THE DRAWINGS

This invention will now be described with reference to its preferred embodiments, given by way of illustration, and shown in the figures attached, as follows:

FIGS. 3 and 4 show the block diagram of the power module in two different embodiments, wherein FIG. 3 shows a first embodiment of the control module in FIG. 1, and FIG. 4 shows a different embodiment of the control module shown in FIG. 3;

DETAILED DESCRIPTION OF THE PREFERRED EMBODIMENTS

Figure 1:
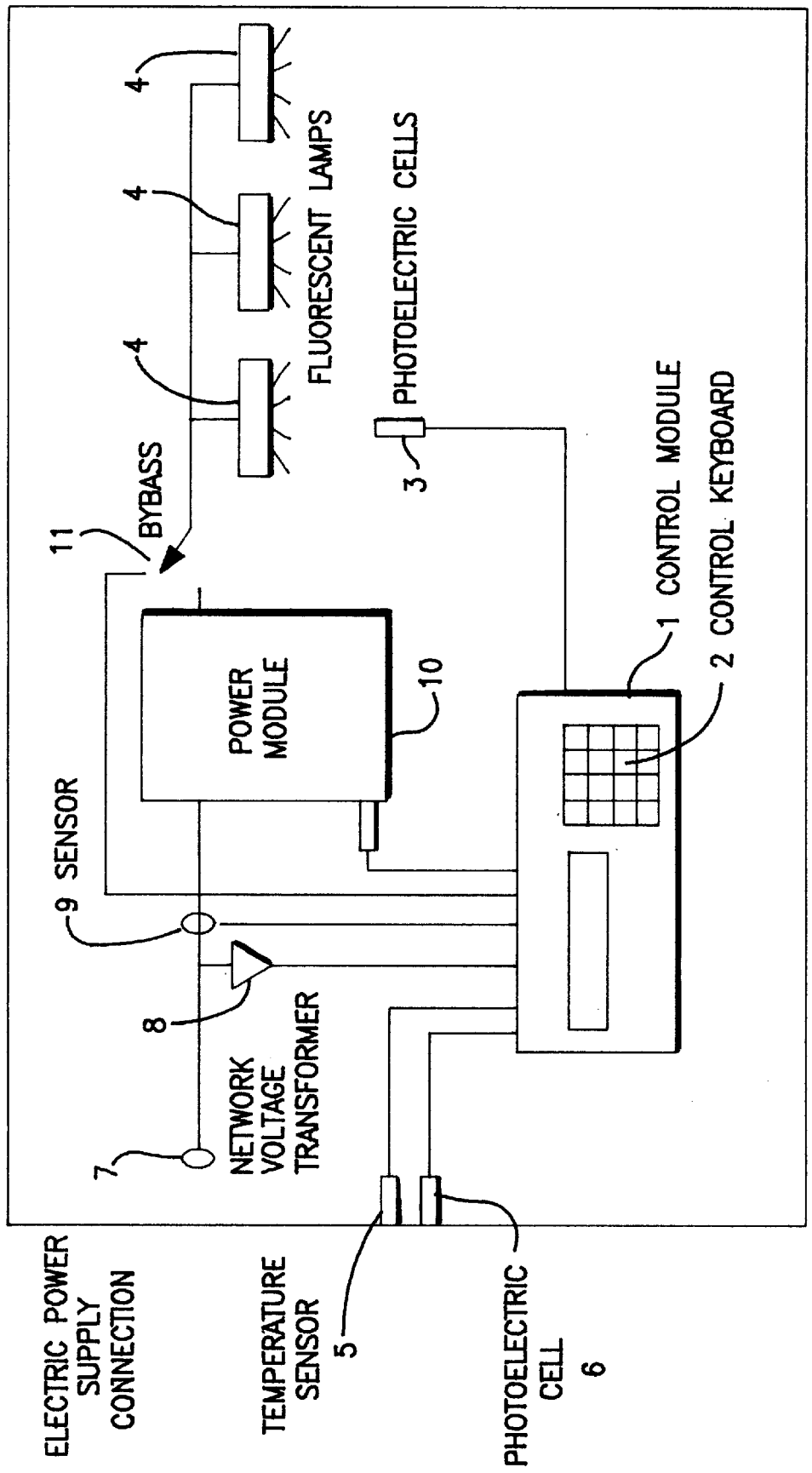
FIG. 1 shows the general block diagram of the device according to the invention.

With reference to the figures and in particular FIG. 1, the device according to the invention comprises control module 1 containing a microprocessor and control keyboard 2. As will be evident below, the microprocessor inside the control module continually monitors—via one or more photoelectric cells 3—the internal luminosity of an environment lit by a plurality of fluorescent lamps 4. Arriving at the microprocessor are signals proportional to the external temperature via temperature sensor 5, and the value of external ambient luminosity via another photoelectric cell 6. Electric power supply connection 7 is checked by network voltage transformer 8 and sensor 9 of input current. The microprocessor in control module 1 controls power module 10, which may be bypassed using bypass switch 11, as will be shown below.

Figure 2:
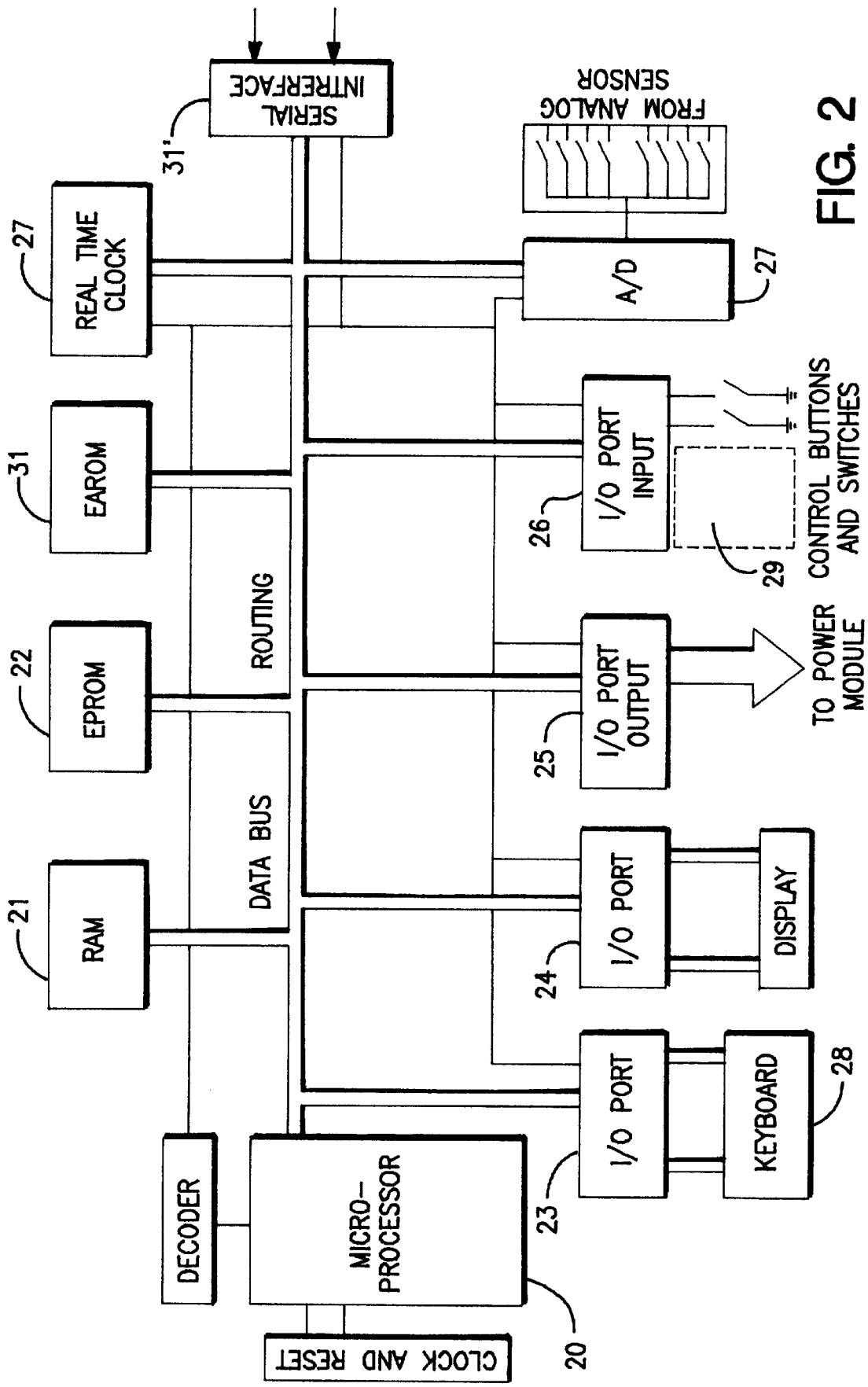
FIG. 2 shows the block diagram of the control module which appears in FIG. 1.

A detailed description of the control module follows with reference to FIG. 2. The control module comprises: microprocessor 20 with Random Access Memory (RAM) 21, Erasable Programmable Read Only Memory (EPROM) 22 (for the program), Input/Output (I/O) digital ports 23, 24, 25, 26, and multichannel analog-to-digital converter 27 (A/D converter). The microprocessor can be of the dispersed logic type or the single chip type. There is a sensor for measuring input voltage in the analog mode (to the A/D converter) or in the digital mode (to a series of comparators), depending on the models; a sensor for measuring the ambient luminosity in the analog mode (to the A/D converter) or digital mode (to a series of comparators) depending on the models; a sensor for ambient measurement in the analog mode (to the A/D converter) or in digital mode (to a series of comparators) depending on the models; a sensor for measuring the internal temperature of the power module (for control of overload) via a threshold comparator; a sensor for measuring the instantaneous current absorbed; a real time clock circuit with backup battery 27; keyboard 28 and various buttons and switches 29; alphanumeric display and/or indicator lights shown in their entirety 30; memory 31 of the Electrically Alterable Read Only Memory (EAROM) type (which can be programmed by this device but can store data in the absence of external power supply) or the equivalent for storing temporary settings; serial interface 31' with electrical protocol RS232 or RS422; and a control program (firmware) stored in the permanent memory.

These elements, depending on the degree of sophistication needed, could be present in whole or in part, in analog or digital versions.

Figure 3:
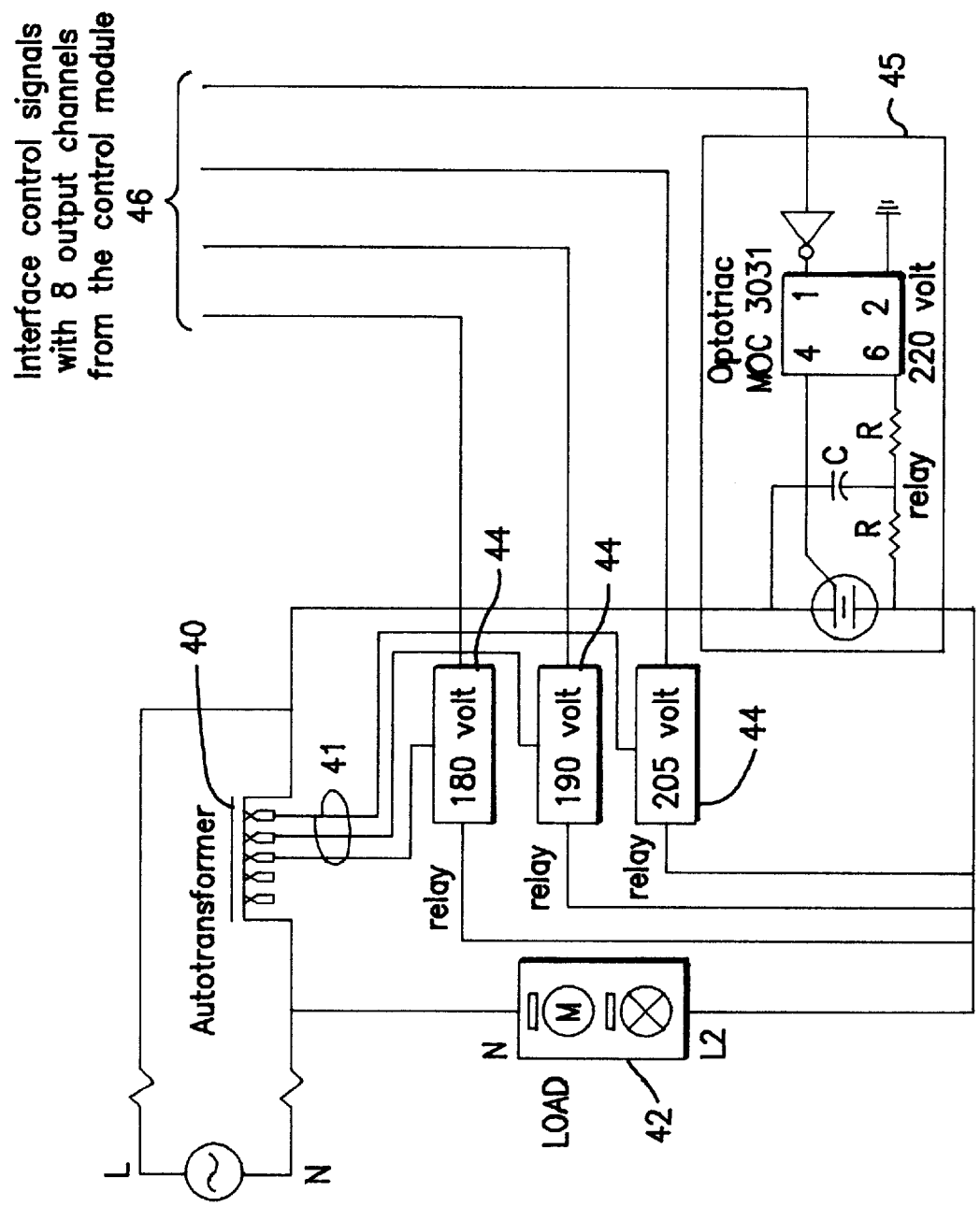
Figure 4:
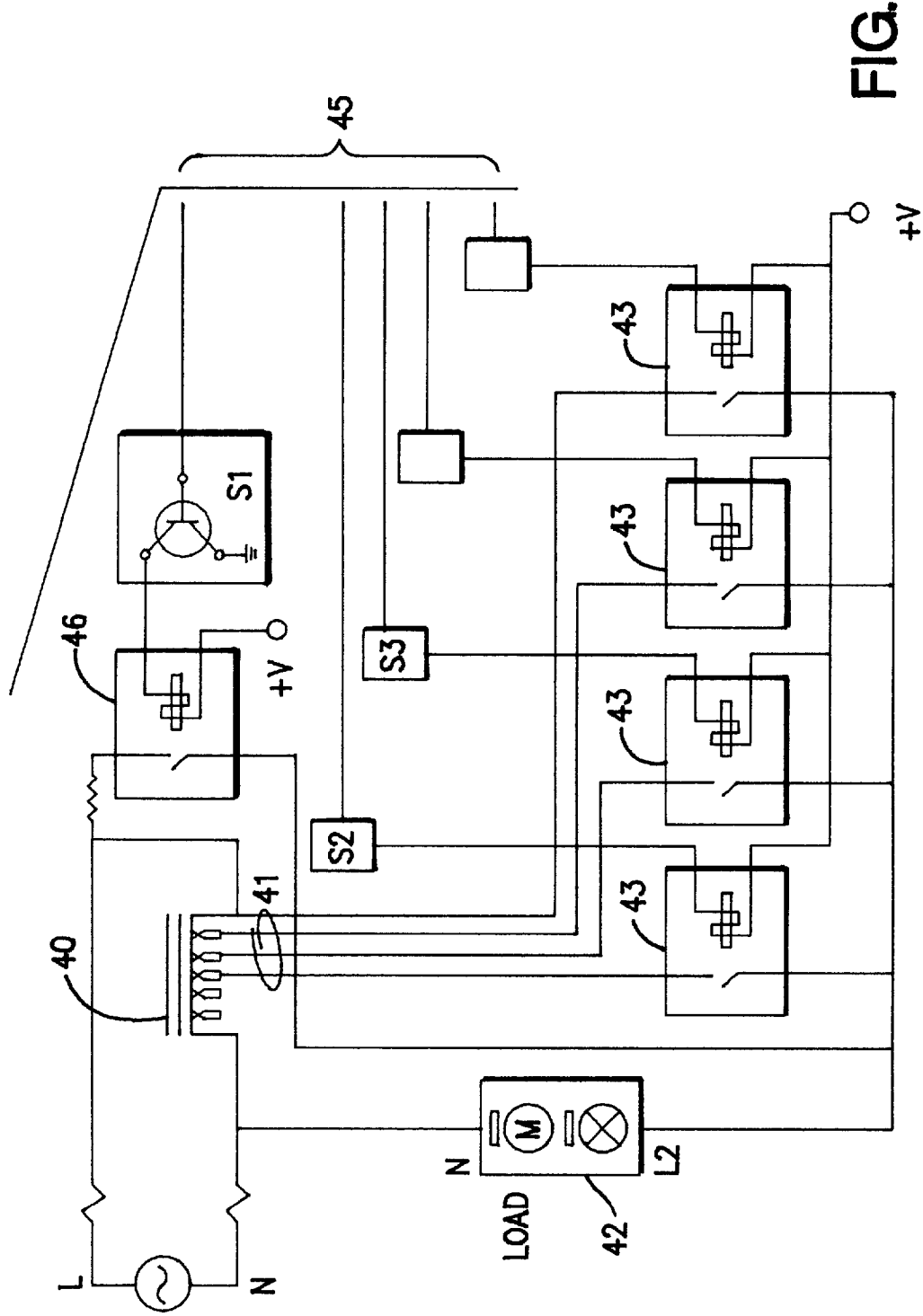
Figure 5:
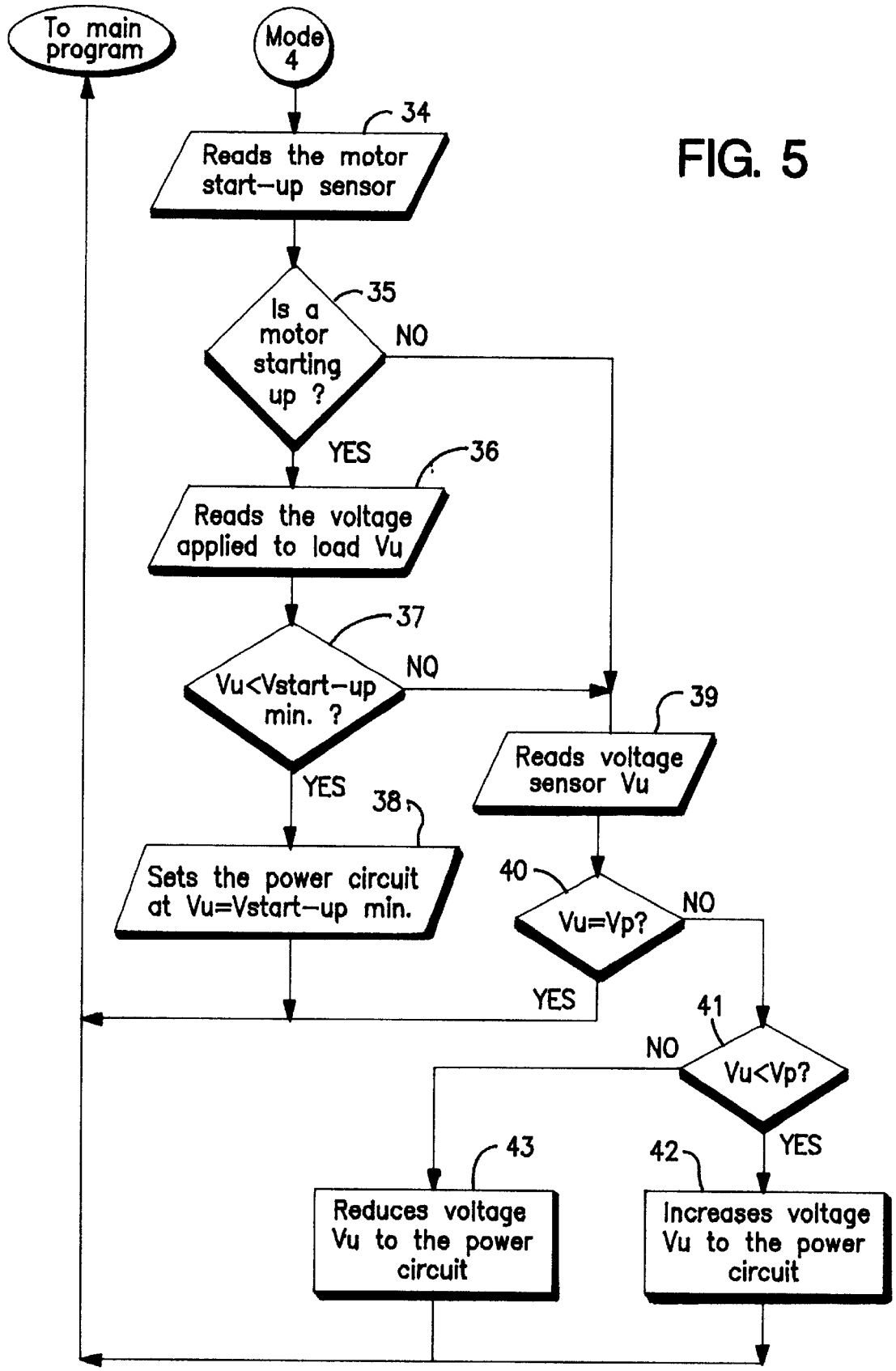
FIGS. 5 through 9 show flow diagrams for the program resident in the microprocessor which is within the control module.
Figure 6:
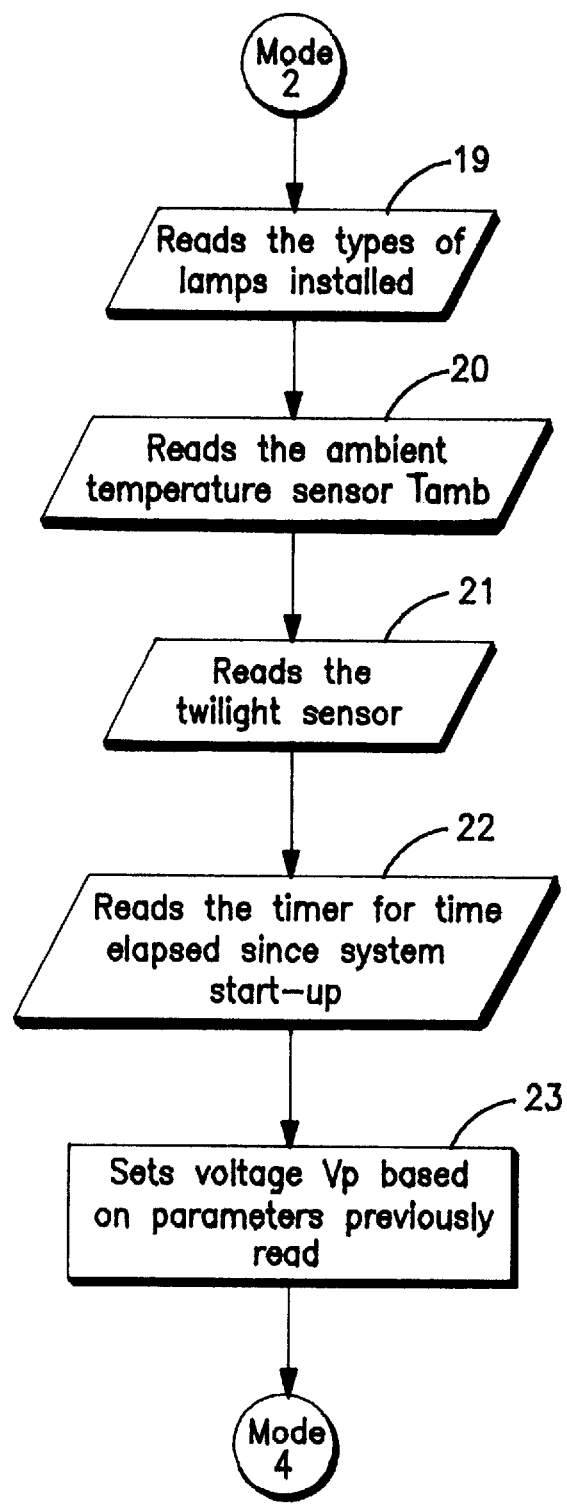
Figure 7:
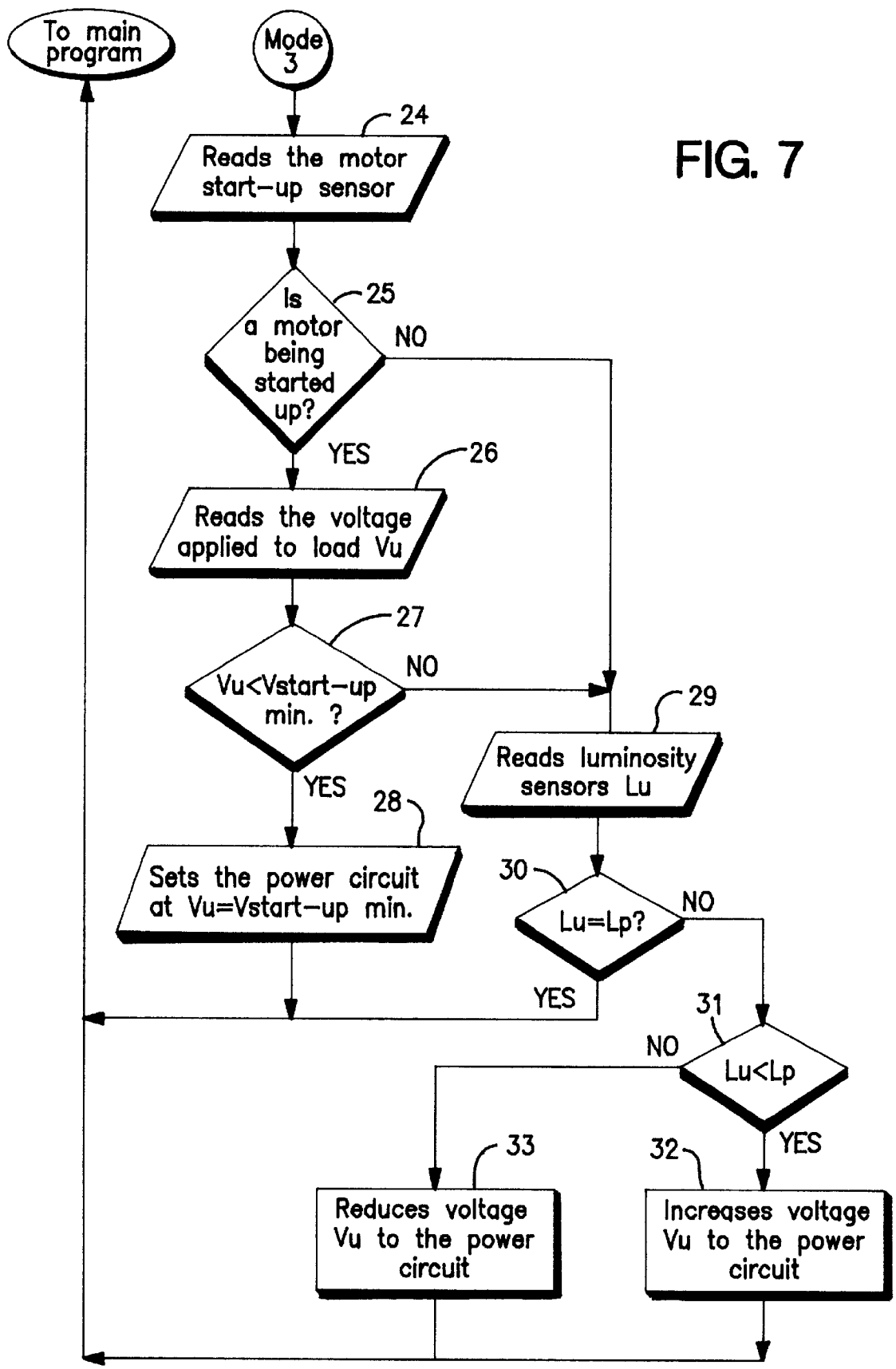
Figure 8:
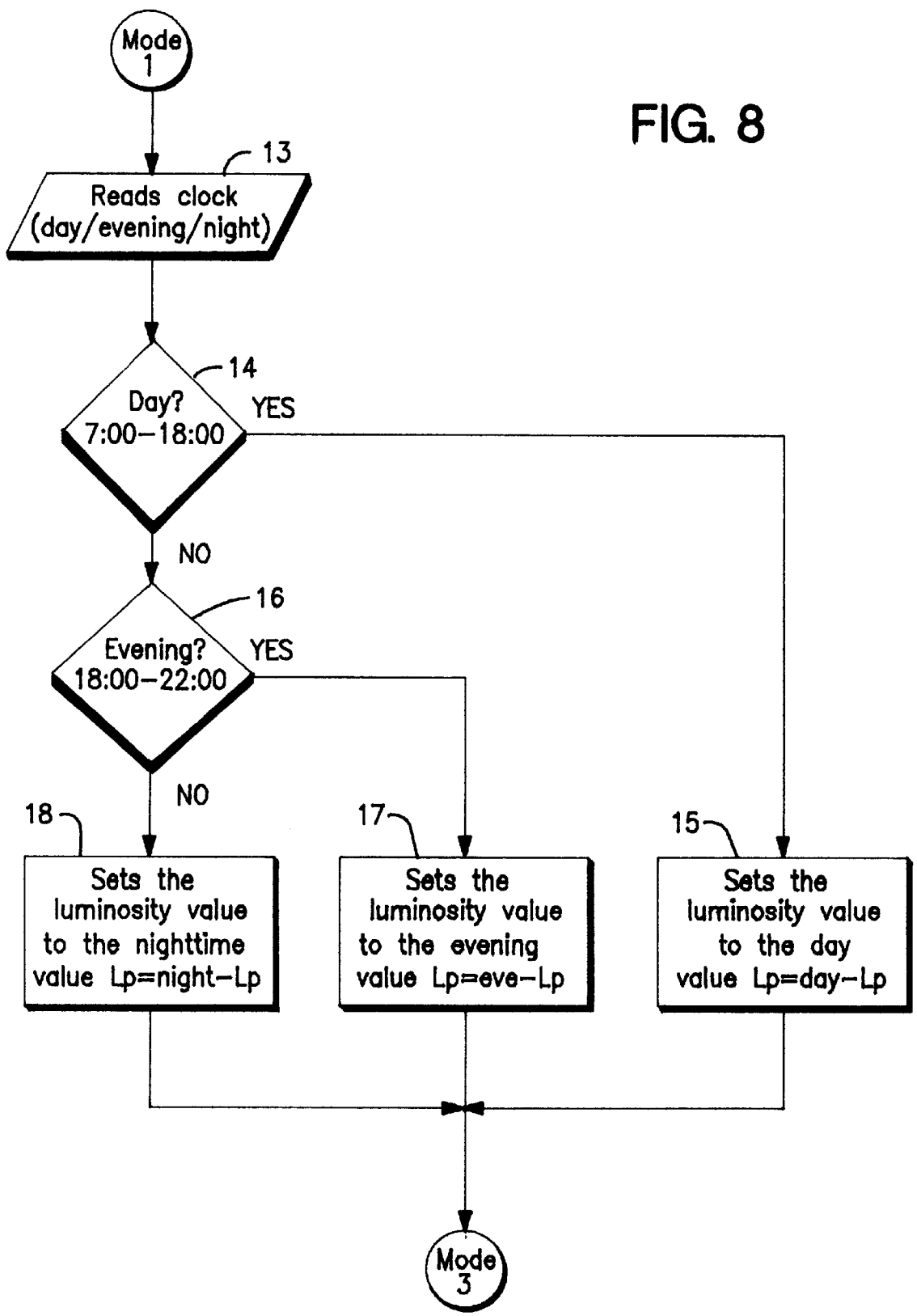
Figure 9:
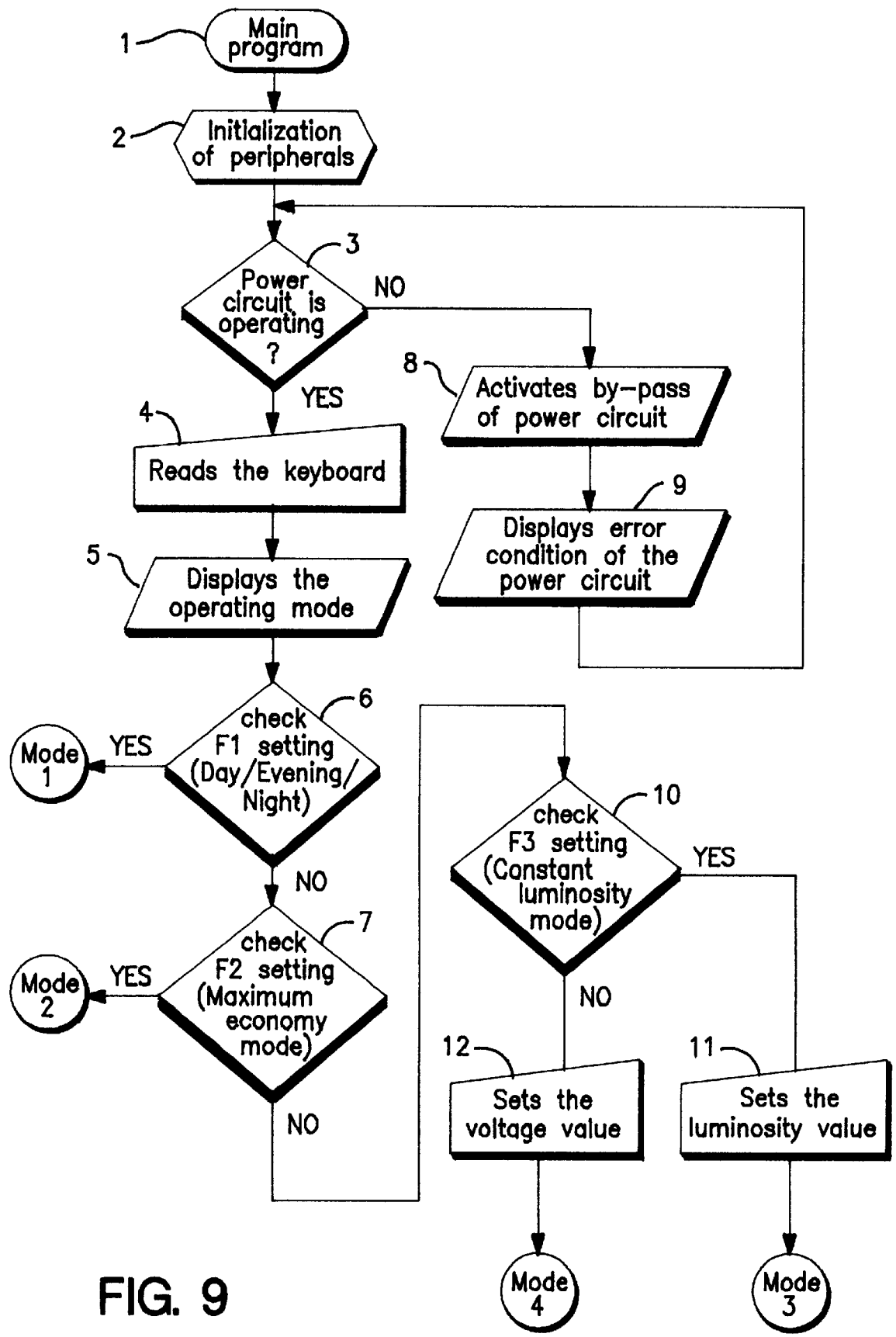
Figure 10A:
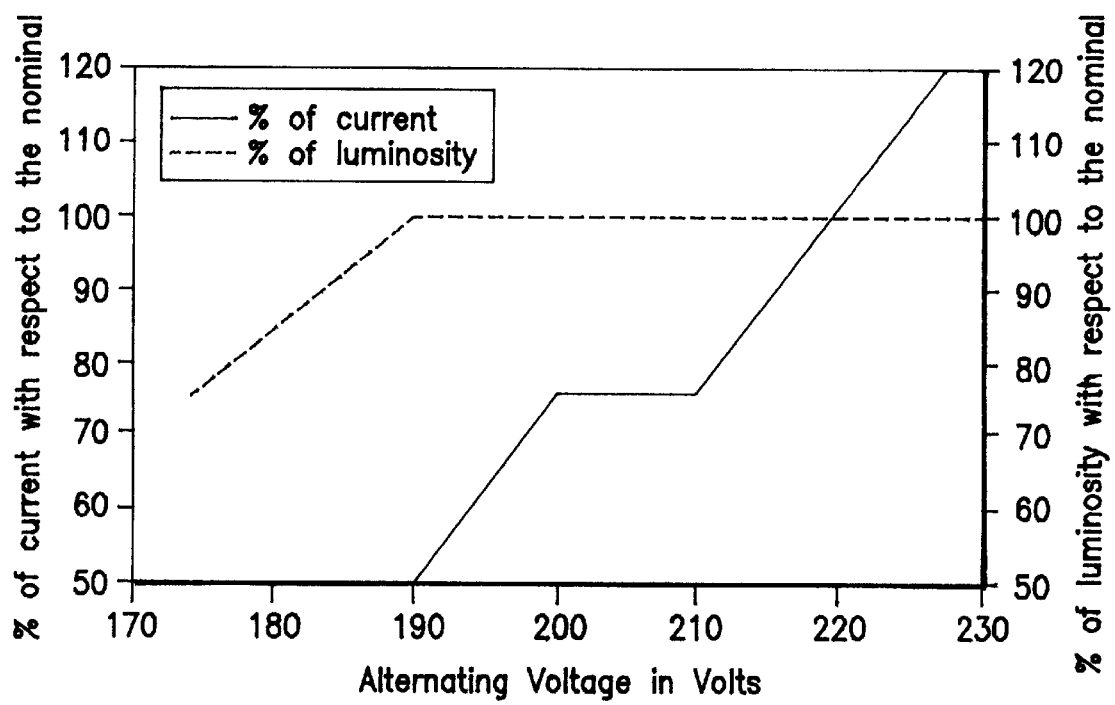
FIGS. 10A through 10F show diagrams of the relationship between current, voltage and light for various light sources.
Figure 10B:
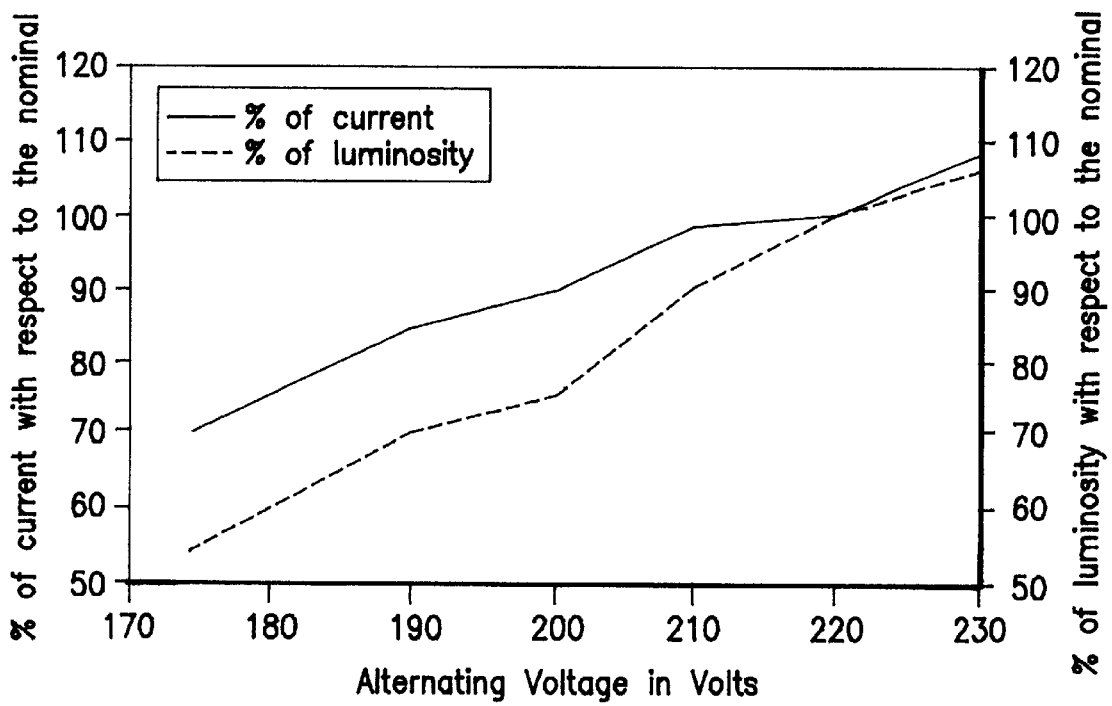
Figure 10C:
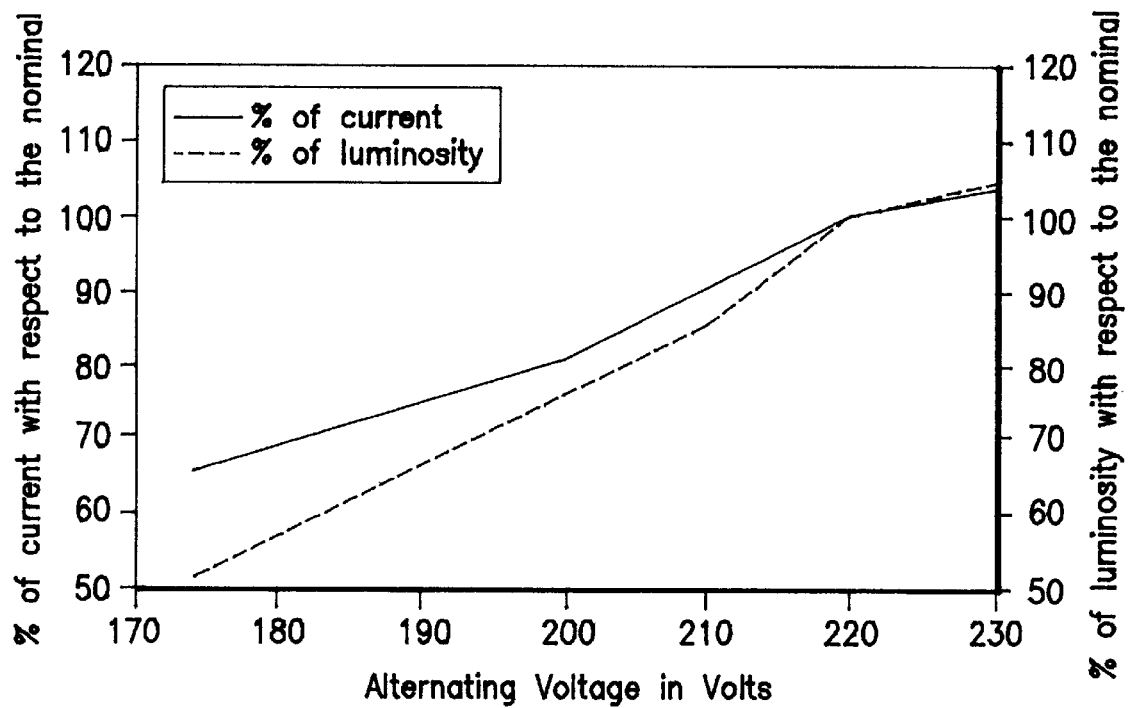
Figure 10D:
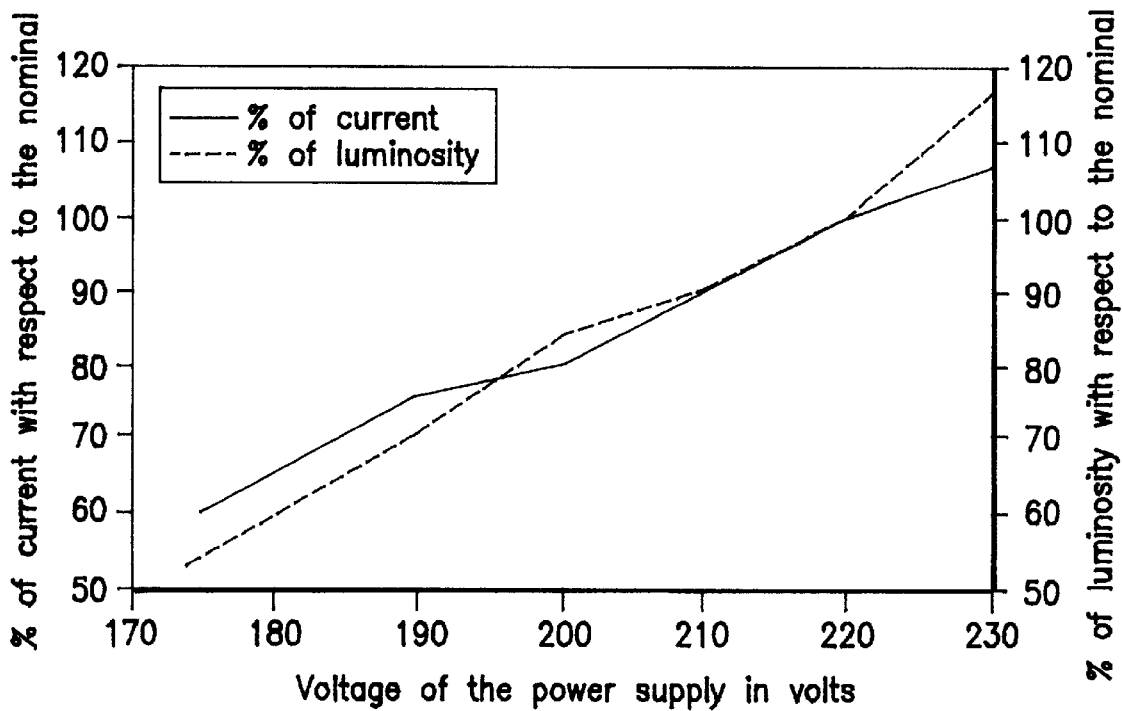
Figure 10E:
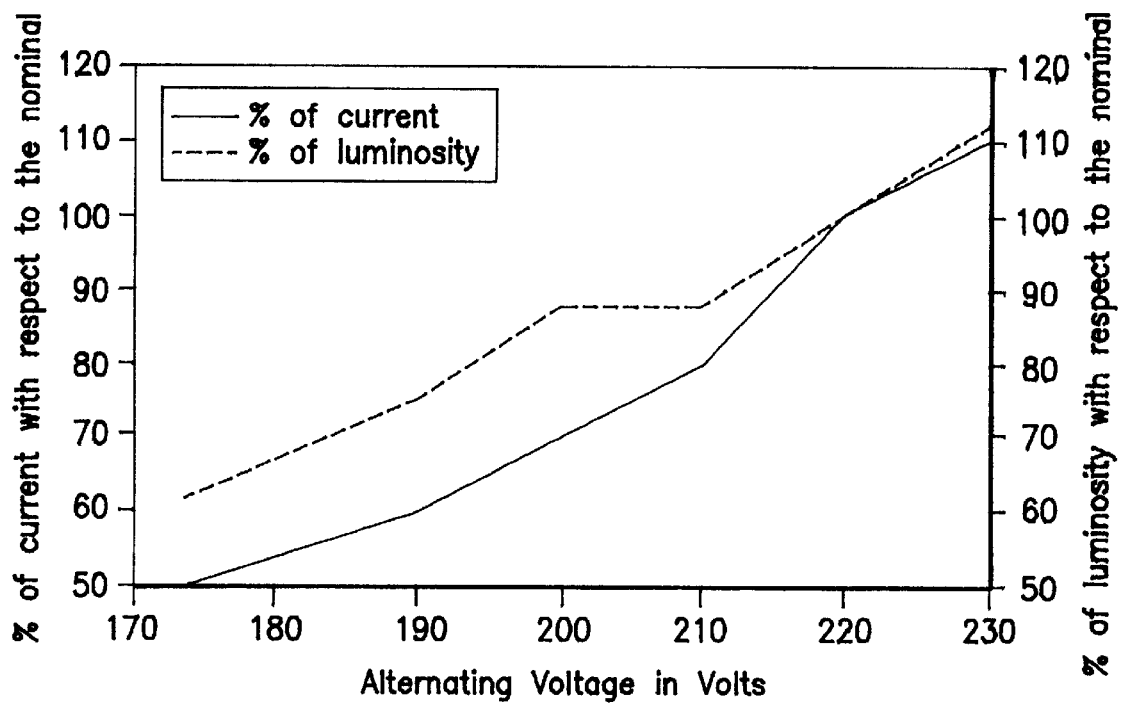
Figure 10F:
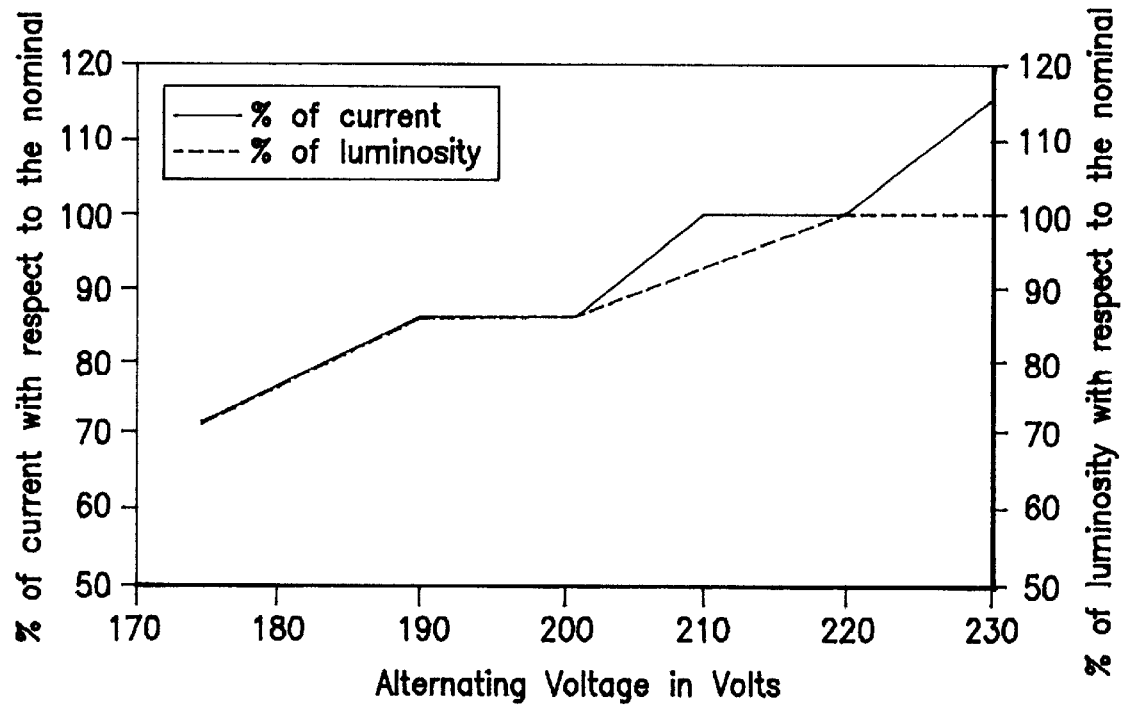

A description of the power module follows with reference to FIGS. 3 and 4. It serves as the interface between the electrical network and the load and can be built in three versions depending on the service and power needed:

passive electromechanical with solid state selectors (FIG. 3);

passive electromechanical with electromechanical selectors (FIG. 4);

active electronic, not shown.

In the first and second cases, an autotransformer 40 of appropriate power is used with input at a nominal 220V and a series of intermediate outlets 41 to supply nominal voltages between the maximum supply voltage of the network and an appropriate lower value (for example 40%). Load 42 is connected to the outlets via a series of remote breakers 43 (FIG. 4) or solid state relays 44 with zerocrossing sensors (FIG. 3).

In the third case, not shown in detail, there is a completely electronic circuit which generates a voltage with a value equal to that required by the control module, without the use of selectors at the output. The waveform of the voltage at the output can be of a sinusoidal type or of the stepped variety, depending on the devices present in the load.

In both cases the power module—which can be housed in a separate container or in the same container as the control module—will have bypass remote breaker 45, 46 and a temperature sensor for overloads. The power module receives commands from the control module on photocoupled lines 46, 47 to eliminate propagation of possible disturbances.

The power module can have (in all three possible configurations) two auxiliary output units: one with the same principal voltage characteristics but with less power (equal to about ⅒), and one completely electronic with phase choking. These outputs can be used to drive accessory devices and possibly emergency lights.

This power module in the completely electronic version can have a battery storage area with related battery charger for direct control of emergency lighting. In this case, the circuit generates voltage at the output from the battery voltage.

The software which runs on the aforementioned microprocessor has a series of functions, present in whole or in part, used alternatively or simultaneously:

automatic day/evening/night operation. The system regulates the current in order to obtain three different levels of luminosity for the respective day, evening, or night operation.

stabilizer function. The system regulates the current at the output, keeping it at the set value independently of the other parameters.

maximum economy operation. The system regulates the current to the lowest level possible, acting on the voltage at the output, according to the ignition time, ambient light, and temperature. In particular, it ensures that voltage sufficient to trigger the lamps is provided for a certain period of time after ignition. After this period the voltage drops to the minimum possible for the type of lamp installed. The current sensor warns the system of the insertion of supplementary devices and triggers a repeat of the high-voltage/low-voltage cycle. Regulation is done independently for every output channel installed.

constant luminosity mode. The system regulates the voltage at the output in order to ensure the selected luminosity level.

motor start-up function. It should be taken into account a priori that other devices of another type may be connected to the electrical line for the light, for example, computers or electric motors. In the case of computers, operation will not be a problem. In the case of motors, the system requires an additional function for re-driving the voltage to nominal value if the current sensor warns of an attempt at start-up. The value is then gradually reduced back to the lower value after a period of time which can be programmed. This function is available in all modes selected.

setting of minimum voltage, minimum luminosity, reaction times, service times.

programming and remote dialog. The system can be controlled, not only by local controls, but also by a centralized control system. It can also send it updated operational data.

by-pass. Following overloads, excessive internal temperature, or internal signalling of breakdown, the software activates the aforementioned remote breaker which bypasses the power module, connecting the lamps directly to the distribution.

FIGS. 5 through 9 show the flow diagram of the main program and related dependent program modules.

Description of the Flow Diagram for Automatic Control of Luminosity

1) Main program

This is the basic starting point for the software of the ignition system. Here, the default settings are defined and internal variables initialized. For example, the operating mode can be set automatically to stabilized constant voltage.

2) Initialization of peripherals

Here, the initial status of output devices (solid state relay, display lamps, etc.) and input devices (pushbuttons, keyboard and luminosity sensors, temperature, current, etc.) are defined.

3) Checks that the power circuit is operating

A diagnostic test of the proper functioning of the critical parts of the power circuit is activated (in particular, it is checked whether there is voltage at the output of the power section).

If the case of proper functioning, the flow passes on to step 4); in case of anomaly, the program flow proceeds to step 8).

4) Reads the keyboard

In this procedure, the pulses from the keyboard are read and interpreted. That is, it manages the dialog with the operator, interprets the commands from him and changes the operating mode of the device.

5) Displays the operating mode

According to the operating mode selected, this procedure shows the related information on the display.

6) Checks F1 setting (Day/Evening/Night)

If the operating mode set is F1, that is, optimized management of the lighting level as a function of three time bands, flow control passes on to step 13);

If the operating mode is different, control passes to step 7).

7) Checks F2 setting (Maximum Economy mode)

If the operating mode set is F2, that is, the function which ensures maximum possible energy savings, the flow control passes to step 19);

If the operating mode is different, it passes to step 10). 8) Activates by-pass of the power circuit If an anomaly in the power section is detected, this procedure bypasses it, connecting the load directly to the network voltage (for example, via a remote breaker).

9) Displays the error condition of the power circuit

This procedure signals functional anomalies of the power circuit. This circuit is continually tested (loop with step 3 of the flow chart) and a diagnostic message remains on the display until the circuit is restored.

10) Checks F3 setting (Constant luminosity mode)

If the operating mode set is F3, that is, the function which keeps the luminous flux as constant as possible, control passes to step 11;

If the operating mode is different (F4), it passes to step 12.

11) Sets the luminosity value (Lp)

This procedure accepts from the keyboard any modifications in the level of illumination of the entire lighting system. If no modification is requested, then the last value set or the default value will be retained and control will pass to step 24.

12) Sets the voltage value (Vp)

The operating mode is F4, that is, stabilization of the voltage at the output. The procedure accepts from the keyboard any modifications in the level of voltage applied to the system. If no modification is requested, then the last value set or the default value will be retained and control will pass to step 34.

13) Reads the clock (day/evening/night)

The procedure acquires the time from the internal clock (real time clock) in order to determine in which operating band the clock is operating. The 24 hours are subdivided into 3 user-programmable time bands. Each band is associated with a level of lighting which the user can reprogram to adapt it to his own requirements.

14) Checks whether the clock is in the Daytime period (7:00 a.m.–6:00 p.m. by default)

It is checked whether the time acquired from the RTC [real time clock] is in the first operating band. If the time read is between 7 in the morning and 6 in the evening, control passes to step 15). If the time read is not in the first band, control passes to step 16).

15) Sets the luminosity to day value (Lp=day-Lp)

The lighting level associated with the day band passes, via variable Lp, to the procedure which keeps it constant for the entire period in which this band is valid (step 24).

16) Checks whether the clock is in the Evening period (6:00 p.m.–10:00 p.m.)

It is checked whether the time acquired from the RTC [real time clock] is in the second operating band. If the time read is between 6:00 p.m. and 10:00 p.m. (second default band), control passes to step 17). If the time read is not in the second band, control passes to step 18).

17) Sets the luminosity to the evening value (Lp=eve-Lp)

The lighting level associated with the evening band passes, via variable Lp, to the procedure which keeps it constant for the entire period in which this band is valid (step 24).

18) Sets the luminosity to the nighttime value (Lp=night-Lp)

The lighting level associated with the night band passes through variable Lp to the procedure which keeps it constant for the entire period in which this band is valid (step 24).

19) Reads the types of lamps installed

When the system is first installed, the device must be supplied with data on the composition of the installed lights to be managed, that is, what types of lamps are installed (fluorescent, electronic, mixed gas, etc.) and in what percentages. The type of technology used by the lamps is a parameter which greatly influences the possibility of optimizing power consumption. Knowledge of the percentages of use of each type of lamp among all the light makes it possible to ultimately optimize consumption. These data are selected using the keyboard and are stored in the EAROM memory.

20) Reads the ambient temperature sensor Tamb

The luminous output of any type of lamp increases with temperature. Monitoring of this parameter makes it possible to reduce by several percentage points the power supply voltage whenever possible in order to lower consumption still further. In this phase, the analog value of the temperature sensor is read and compared to a table stored in the memory which supplies the increase or decrease of the value at the output. The sensor is read using the A/D converter, finding a weighted average on various consecutive readings to avoid the influence of possible disturbances.

21) Reads the twilight sensor

The natural light of controlled environments is another determining factor in lowering consumption. Measurement by these sensors makes it possible to control the luminous flux emitted by lamps, while at the same time accounting for sources of external light, whether solar or artificial, in which case the value is obtained through a series of averaged readings taken on an A/D converter.

22) Reads the timer for time elapsed since system start-up

Knowledge of how long the system has been operating makes it possible to work at lower operating voltages and to save energy. The timer is managed using the real time clock as a reference and sets a table of modifications similar to preceding ones.

23) Sets voltage Vp based on parameters previously read

All the parameters derived thus far are processed to define an optimum voltage value Vp to be applied to the lamps. This value is then used as a pointer to a series of tables (those which were established by reading the analog values discussed in preceding sections). The value of the voltage at the output is therefore dynamically modified. Flow control passes to step 4).

24) Reads the motor start-up sensor

The analog value of the current is read (via the inductive sensor and the corresponding circuit which leads to another A/D channel). The value read is compared with the one measured in the brief period preceding it to reveal any increases which indicate an attempt to start up a motor.

25) Checks whether a motor is being started up

It is checked whether there has been a major instantaneous absorption of current (which could indicate a motor being started up); if so, control passes to step 26).

If consumption of current is constant on the average, control passes to step 29).

26) Reads the voltage applied to load Vu

Reads the voltage at the output applied to the load via a decoupling and reduction circuit and a channel connected to the A/D.

27) Checks whether voltage Vu<V start-up min

If the voltage at the output Vu is less than the minimum voltage at which a 220 V motor can be started up, control passes to step 28) which regulates the voltage to the proper level;

If the voltage at the output Vu is greater than or equal to the minimum start-up voltage, control passes to step 29).

28) Sets the power circuit at Vu=V start-up min

Temporarily modifies the value Vu to a level which will enable start-up of the motor. This level will then be changed back to the preceding value after an appropriate period of time.

29) Reads luminosity Lu sensors

Reads the circuit with the photoelectric cell to measure the average level of luminous flux present within the environments being monitored.

30) Checks whether luminosity is Lu=Lp

The measurement read is compared to the set flux value. If the values are the same there is no need for intervention and control returns to the main cycle, step 3).

If the values are different, control passes to step 31) for further analysis.

31) Checks whether luminosity is Lu<Lp

If the value read is less than the one previously set it jumps to step 32) for correction;

If the value read is greater than the level set, it jumps to step 33).

32) Increases voltage Vu to the power circuit

The method of successive approximations is used to increase the voltage to the load in order to keep luminosity as close as possible to the selected luminosity. Control returns to the main cycle, step 3).

33) Reduces voltage Vu to the power circuit

The method of successive approximations is used to reduce the voltage to the load in order to keep luminosity as close as possible to the selected luminosity. Control returns to the main cycle, step 3).

34) Reads the motor start-up sensor
    (see step 24).
35) Checks whether a motor is being started up
    (see step 25)
36) Reads the voltage applied to load Vu
    (see step 26)
37) Checks whether voltage Vu is<V start-up min
    (see step 27)
38) Sets the power circuit at Vu=V start-up min
    (see step 28)
39) Reads voltage sensors Vu The voltage applied to the load is measured.

40) Checks whether voltage Vu=Vp

The measurement read is compared to the selected voltage value.

If the values are the same, no intervention is required and control returns to the main cycle, step 3).

If the values are different, control passes to step 41) for further analysis.

41) Checks whether voltage is Vu<Vp

If the value read is less than the one previously set, it jumps to step 42) for correction;

If the value read is greater than the level set, it jumps to step 43).

42) Increases voltage Vu to the power circuit

The method of successive approximations is used to increase the voltage to the load in order to keep voltage as close as possible to the selected voltage. Control returns to the main cycle, step 3).

43) Reduces voltage Vu to the power circuit

The method of successive approximations is used to decrease the voltage to the load in order to keep voltage as close as possible to the selected voltage. Control returns to the main cycle, step 3).

Appendix: FIGS. 10A–10F show diagrams of power supply voltage/percentage of current absorbed with respect to the nominal voltage/percentage of luminosity with respect to the nominal for various light sources.

I claim:

1. A device for optimized management of fluorescent lamps comprising:

a control module having a microprocessor with a control program in the permanent memory equipped with at least one of the following accessories: A/D converters; an internal "real time" clock; one of asynchronous and synchronous serial interface with one of RS232 and RS422 protocol; one of EAROM and EEPROM memory; a keyboard with one of an LCD and an LED display; control pushbuttons and indicator lights; and analog sensors for ac voltage, ambient light, external light, ambient temperature, power module temperature, and alternating current;

an internal control program, stored in the permanent memory equipped with the following functions: automatic luminosity adjustment for day/evening/night setting; voltage stabilization; maximum economy setting to maintain current at a lowest possible level; constant luminosity setting; bypass of the power module; motor starting; programming and remote dialog; and independent management of voltage, luminosity, reaction time, and service time outputs;

an electronic power module for changing the voltage at the output within a range between a maximum power supply voltage and a lower appropriate voltage, at a command of the control module; and an electromechanical bypass element for bypassing the power module.

2. The device for optimized management of fluorescent lamps according to claim 1, wherein the sensors for current, voltage, light and temperature comprise a series of threshold comparators.

3. The device for optimized management of fluorescent lamps according to claim 1, wherein the power module further includes a battery unit, a battery charger, and a step-up transformer as a backup power supply for the lamps.

4. The device for optimized management of fluorescent lamps according to claim 1, wherein the power module comprises an autotransformer with input connected to an electrical network and a series of intermediate outlets for acquiring various levels of voltage via a series of remote breakers.

5. The device for optimized management of fluorescent lamps according to claim 1, wherein the power module comprises an autotransformer with input connected to an electrical network and a series of intermediate outlets for acquiring various levels of voltage via a series of solid state relays.

6. The device for optimized management of fluorescent lamps according to claim 1, wherein the power module comprises a group of auxiliary outputs equal to 10% of a comprehensive maximum for separate power supply of a group of elements.

7. The device for optimized management of fluorescent lamps according to claim 1, wherein the power module also comprises a group of auxiliary electronic outputs with phase distribution regulation for power supply of electrical devices other than fluorescent lamps.

8. The device for optimized management of fluorescent lamps according to claim 1, wherein the microprocessor in the control module is able to operate with a program having the following steps:

1) defining default settings and initializing internal variables;
2) initializing peripherals;
3) checking operation of a power circuit and proceeding step 8 in case of anomaly;
4) reading said keyboard;
5) displaying an operation mode;
6) checking said day/evening/night setting and proceeding to step 13, if the operation mode set is day/evening/night;
7) checking said maximum economy setting and proceeding to step 19, if the operation mode set is maximum economy, else proceeding to step 10;
8) activating a by-pass of the power circuit;

9) displaying an error condition of the power circuit;
10) checking said constant luminosity setting and proceeding to step 12 if the operation mode set is not constant luminosity;
11) setting a selected luminosity value if needed and proceeding to step 24, if no modification of the selected luminosity value is needed;
12) setting a selected voltage if needed and proceeding to step 34, if no modification of said selected voltage is needed;
13) reading a clock for a time;
14) checking if the time is in a daytime period and proceeding to step 16, if not;
15) setting the selected luminosity value to day value and proceeding to step 24;
16) checking if the time is in an evening period and proceeding to step 18, if not;
17) setting the selected luminosity value to evening value and proceeding to step 24;
18) setting the selected luminosity value to nighttime value and proceeding to step 24;
19) reading types of lamps installed;
20) reading an ambient temperature sensor;
21) reading a twilight sensor;
22) reading a timer for time elapsed since system start-up;
23) setting said selected voltage based on the readings of steps 19–22 and proceeding to step 4;
24) reading a motor start-up sensor;
25) checking whether a motor is being started up and proceeding to step 29 if no motor is being started up;
26) reading a voltage applied to a load;
27) checking whether the voltage applied to the load is less then a minimum voltage at which a 220V motor can be started up, and proceeding to step 29, if not;
28) setting the voltage at the load to a voltage level which will enable start-up of a motor;
29) reading luminous flux from luminosity sensors;
30) checking whether luminosity flux value read is equal to the selected luminosity value and if so, proceeding to step 3;
31) checking whether the luminous flux value read is greater than the selected luminosity value and if so, proceeding to step 33;
32) increasing the voltage at the load to keep the luminous flux as close as possible to the selected luminosity value and proceeding to step 3;
33) reducing the voltage at the load to keep the luminous flux as close as possible to the selected luminosity value and proceeding to step 3;
34) reading the motor start-up sensor;
35) checking whether a motor is being started up, and if so, proceeding to step 39;
36) reading the voltage applied to the load;
37) checking whether the voltage applied to the load is less than the voltage level which will enable start-up of a motor and if not, proceeding to step 39;
38) setting the voltage applied to the load to the voltage level which will enable start-up of a motor;
39) reading voltage sensors;
40) checking whether the voltage applied to the load is equal to selected voltage and if so, proceeding to step 3;
41) checking whether the voltage applied to the load is less than the selected voltage and if not proceeding to step 43;
42) increasing the voltage applied to the load to keep the voltage applied to the load as close as possible to the selected voltage and then proceeding to step 3; and
43) decreasing the voltage applied to the load to keep the voltage applied to the load as close as possible to the selected voltage and then proceeding to step 3.

* * * * *

UNITED STATES PATENT AND TRADEMARK OFFICE
CERTIFICATE OF CORRECTION

PATENT NO. : 5,811,942
DATED : September 22, 1998
INVENTOR(S) : Roberto PEDRETTI It is certified that error appears in the above-indentified patent and that said Letters Patent is hereby corrected as shown below:

On the title page: Item [54] and Column 1, line 1, change the title to --INTELLIGENT REGULATION SYSTEM FOR OPTIMIZED CURRENT MANAGEMENT OF FLUORESCENT LAMPS--.

Signed and Sealed this

Eighth Day of December, 1998

Attest:

BRUCE LEHMAN

Attesting Officer

Commissioner of Patents and Trademarks